(12) United States Patent
Stevens, Jr.

(10) Patent No.: US 11,519,184 B2
(45) Date of Patent: *Dec. 6, 2022

(54) PANEL

(71) Applicant: UNILIN NORDIC AB, Malmö (SE)

(72) Inventor: Charles Edward Stevens, Jr., Dudley, NC (US)

(73) Assignee: UNILIN NORDIC AB, Malmo (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,319

(22) Filed: Mar. 29, 2022

(65) Prior Publication Data

US 2022/0220747 A1    Jul. 14, 2022

Related U.S. Application Data

(63) Continuation of application No. 17/104,715, filed on Nov. 25, 2020, which is a continuation of application No. 16/600,957, filed on Oct. 14, 2019, now Pat. No. 10,883,277, which is a continuation of application No. 16/005,364, filed on Jun. 11, 2018, now Pat. No. 10,443,248, which is a continuation of application
(Continued)

(51) Int. Cl.
| | |
|---|---|
| *E04F 15/02* | (2006.01) |
| *E04F 15/04* | (2006.01) |
| *E04F 15/10* | (2006.01) |
| *F16B 5/00* | (2006.01) |

(52) U.S. Cl.
CPC ...... *E04F 15/02038* (2013.01); *E04F 15/045* (2013.01); *E04F 15/105* (2013.01); *E04F 15/107* (2013.01); *E04F 2201/0138* (2013.01);

*E04F 2201/0146* (2013.01); *E04F 2201/0153* (2013.01); *E04F 2201/023* (2013.01); *E04F 2201/03* (2013.01); *E04F 2201/042* (2013.01); *E04F 2201/043* (2013.01); *F16B 5/0056* (2013.01)

(58) Field of Classification Search
None
See application file for complete search history.

(56) References Cited

U.S. PATENT DOCUMENTS

| | | |
|---|---|---|
| 2,045,067 A | 6/1936 | Bruce |
| 2,222,137 A | 11/1940 | Bruce |
| (Continued) | | |

FOREIGN PATENT DOCUMENTS

| | | |
|---|---|---|
| DE | 10305695 A1 | 9/2004 |
| DE | 202010017178 U1 | 8/2011 |
| (Continued) | | |

OTHER PUBLICATIONS

Decision revoking the European Patent EP-B-1 276 941 dated Oct. 21, 2011.
(Continued)

*Primary Examiner* — Kyle J. Walraed-Sullivan
(74) *Attorney, Agent, or Firm* — Jenkins, Wilson, Taylor & Hunt, P.A.

(57) ABSTRACT

A panel, which, at two opposite edges, includes coupling parts that allow joining by a downward movement, the coupling parts including a male part that fits in a female part, wherein the male part comprises a laterally protruding lip with at a lower side a downward facing support surface.

19 Claims, 3 Drawing Sheets

Related U.S. Application Data

No. 15/419,505, filed on Jan. 30, 2017, now Pat. No. 9,995,045, which is a continuation of application No. 14/633,923, filed on Feb. 27, 2015, now Pat. No. 9,574,354, which is a continuation of application No. PCT/IB2013/058022, filed on Aug. 27, 2013.

(60) Provisional application No. 61/693,668, filed on Aug. 27, 2012.

(56) References Cited

U.S. PATENT DOCUMENTS

| | | | |
|---|---|---|---|
| 2,276,071 | A | 3/1942 | Scull |
| 2,430,200 | A | 11/1947 | Wilson |
| 5,630,304 | A * | 5/1997 | Austin .................... E04F 15/10 |
| | | | 52/592.1 |
| 6,216,409 | B1 | 4/2001 | Roy et al. |
| 6,332,733 | B1 * | 12/2001 | Hamberger ............ C08L 81/06 |
| | | | 52/592.4 |
| 6,345,481 | B1 * | 2/2002 | Nelson ................... E04F 15/04 |
| | | | 52/592.4 |
| 6,536,178 | B1 | 3/2003 | Palsson et al. |
| 6,591,568 | B1 | 7/2003 | Palsson |
| 6,922,965 | B2 | 8/2005 | Rosenthal et al. |
| 7,121,058 | B2 | 10/2006 | Palsson et al. |
| 7,251,916 | B2 | 8/2007 | Konzelmann et al. |
| 7,332,053 | B2 | 2/2008 | Palsson et al. |
| 7,441,385 | B2 | 10/2008 | Palsson et al. |
| 7,484,337 | B2 * | 2/2009 | Hecht ................... E04F 15/181 |
| | | | 52/592.1 |
| 7,506,481 | B2 | 3/2009 | Grafenauer |
| 7,516,588 | B2 * | 4/2009 | Pervan ............. E04F 15/02038 |
| | | | 52/592.1 |
| 7,874,118 | B2 * | 1/2011 | Schitter ................... B44C 5/043 |
| | | | 52/581 |
| 7,975,451 | B2 | 7/2011 | Leopolder et al. |
| 8,001,741 | B2 * | 8/2011 | Duernberger ........... E04F 15/02 |
| | | | 52/592.1 |
| 8,146,318 | B2 | 4/2012 | Palsson et al. |
| 8,191,328 | B1 * | 6/2012 | Liu ......................... E04F 15/04 |
| | | | 52/390 |
| 8,544,233 | B2 | 10/2013 | Palsson et al. |
| 8,578,675 | B2 | 11/2013 | Palsson et al. |
| 8,607,532 | B2 | 12/2013 | Permesang |
| 9,260,869 | B2 | 2/2016 | Palsson et al. |
| 9,316,006 | B2 | 4/2016 | Palsson et al. |
| 9,574,354 | B2 | 2/2017 | Stevens |
| 9,677,285 | B2 | 6/2017 | Palsson et al. |
| 9,995,045 | B2 | 6/2018 | Stevens |
| 10,443,248 | B2 | 10/2019 | Stevens, Jr. |
| 10,883,277 | B2 | 1/2021 | Stevens |
| 2002/0178681 | A1 | 12/2002 | Zancai et al. |
| 2003/0101674 | A1 * | 6/2003 | Pervan ..................... E04C 2/20 |
| | | | 52/592.1 |
| 2004/0211144 | A1 | 10/2004 | Stanchfield |
| 2005/0204676 | A1 | 9/2005 | Weitzer |
| 2005/0247000 | A1 | 11/2005 | Zhu |
| 2006/0075713 | A1 | 4/2006 | Pervan et al. |
| 2006/0179773 | A1 | 8/2006 | Pervan |
| 2007/0130872 | A1 | 6/2007 | Goodwin et al. |
| 2008/0000185 | A1 | 1/2008 | Duernberger |
| 2008/0000188 | A1 | 1/2008 | Pervan |
| 2008/0241440 | A1 | 10/2008 | Bauer |
| 2008/0307739 | A1 * | 12/2008 | Clucas ..................... E04B 1/24 |
| | | | 52/580 |
| 2009/0223162 | A1 | 9/2009 | Chen et al. |
| 2009/0249733 | A1 | 10/2009 | Moebus |
| 2010/0031594 | A1 | 2/2010 | Liu et al. |
| 2010/0037550 | A1 * | 2/2010 | Braun ................... E04G 23/006 |
| | | | 52/588.1 |
| 2010/0218450 | A1 | 9/2010 | Braun et al. |
| 2011/0094178 | A1 * | 4/2011 | Braun ..................... F16B 5/0056 |
| | | | 52/745.21 |
| 2011/0131909 | A1 | 6/2011 | Hannig |
| 2011/0138722 | A1 | 6/2011 | Hannig |
| 2011/0167744 | A1 | 7/2011 | Whispell et al. |
| 2011/0258959 | A1 * | 10/2011 | Braun ..................... E04F 15/02 |
| | | | 52/588.1 |
| 2012/0066996 | A1 | 3/2012 | Konstanczak |
| 2012/0174521 | A1 * | 7/2012 | Schulte ................... E04F 15/02 |
| | | | 29/428 |
| 2013/0008118 | A1 | 1/2013 | Baert et al. |
| 2013/0042563 | A1 | 2/2013 | Pervan et al. |
| 2013/0180193 | A1 * | 7/2013 | Bossuyt ................... E04F 15/04 |
| | | | 52/309.1 |
| 2013/0247502 | A1 * | 9/2013 | Zhang ..................... E04F 15/10 |
| | | | 52/745.13 |
| 2013/0276398 | A1 | 10/2013 | Hannig |
| 2013/0309441 | A1 | 11/2013 | Hannig |
| 2014/0033633 | A1 * | 2/2014 | Kell ................... E04F 15/02033 |
| | | | 403/348 |
| 2014/0165493 | A1 | 6/2014 | Palsson |
| 2014/0215946 | A1 * | 8/2014 | Roy ........................ E04F 15/02 |
| | | | 52/309.1 |
| 2014/0325930 | A1 * | 11/2014 | Schneider ......... E04F 15/02038 |
| | | | 52/588.1 |
| 2015/0152644 | A1 * | 6/2015 | Boo .................... E04F 13/0894 |
| | | | 52/588.1 |
| 2015/0240500 | A1 * | 8/2015 | Stevens, Jr. ........... E04F 15/045 |
| | | | 52/588.1 |
| 2016/0237697 | A1 | 8/2016 | Palsson |
| 2017/0138061 | A1 | 5/2017 | Stevens, Jr. |
| 2018/0291636 | A1 | 10/2018 | Stevens |
| 2020/0040590 | A1 | 2/2020 | Stevens |
| 2021/0079665 | A1 | 3/2021 | Stevens |

FOREIGN PATENT DOCUMENTS

| | | |
|---|---|---|
| EP | 2009195 B1 | 12/2008 |
| EP | 2009197 A1 | 12/2008 |
| EP | 2 895 667 B1 | 12/2019 |
| JP | 07300979 A | 11/1995 |
| SE | 0001149 | 10/2001 |
| WO | WO 94/26999 A1 | 11/1994 |
| WO | WO 97/47834 A1 | 12/1997 |
| WO | WO 00/47841 A1 | 8/2000 |
| WO | WO 01/02669 | 1/2001 |
| WO | WO 2005/088029 A1 | 9/2005 |
| WO | WO 2007/141605 A2 | 12/2007 |
| WO | WO 2009/066153 A2 | 5/2009 |
| WO | WO 2010/017453 A2 | 2/2010 |
| WO | WO 2010/072357 A2 | 7/2010 |
| WO | WO 2012/001503 A1 | 1/2012 |
| WO | WO 2012/126046 A1 | 9/2012 |

OTHER PUBLICATIONS

European Patent Office Opposition Division Decision for Application No. 01906461.7 dated Oct. 21, 2011.

Daiken Trade & Ind Co LTD, Patent Abstract of Japan, Publication No. 07300979, Nov. 14, 1995.

E1—"Versatility with the UltraLock System!" Feb. 9, 2000—Alleged Prior Art cited in European Patent Office Opposition for Application No. 01906461.7.

E2—Photographs of "Long Side" and "Short Side," Nov. 1999—Alleged Prior Art cited in European Patent Office Opposition for Application No. 01906461.7.

E3—Affidavit; booklet titled, "Versatility with the UltraLock System!"—Alleged Prior Art cited in European Patent Office Opposition for Application No. 01906461.7.

International Search Report with Written Opinion for Application No. PCT/IB2013/058022 dated Jan. 17, 2014.

Non-Final Office Action for U.S. Appl. No. 14/098,187 dated Jun. 16, 2014.

European Patent Office Board of Appeal Decision for Application No. 01906461.7 dated Jul. 24, 2014.

Notice of Allowance for U.S. Appl. No. 14/098,187 dated Dec. 26, 2014.

Notice of Allowance for U.S. Appl. No. 14/098,187 dated Apr. 8, 2015.

(56) References Cited

OTHER PUBLICATIONS

Non-Final Office Action for U.S. Appl. No. 14/633,923 dated Jul. 1, 2015.
Final Office Action for U.S. Appl. No. 14/633,923 dated, Nov. 19, 2015.
Notice of Allowance for U.S. Appl. No. 14/098,187 dated Sep. 10, 2015.
European Patent Office Opposition for U.S. Appl. No. 08/166,656 dated Jan. 20, 2016.
Non-Final Office Action for U.S. Appl. No. 14/633,923 dated Mar. 31, 2016.
Non-Final Office Action for U.S. Appl. No. 15/043,083 dated Aug. 9, 2016.
Response to European Patent Office Opposition for U.S. Appl. No. 08/166,656 dated Aug. 22, 2016.
Notice of Allowance for U.S. Appl. No. 14/633,923 dated Oct. 7, 2016.
European Office Action for Application No. 13785921.1 dated Dec. 19, 2016.
Non-Final Office Action for U.S. Appl. No. 15/419,505 dated Apr. 12, 2017.
European Office Action for Application No. 13785921.1 dated Jul. 25, 2017.
Final Office Action for U.S. Appl. No. 15/419,505 dated Aug. 30, 2017.
Notice of Allowance and Applicant-Initiated Interview Summary for U.S. Appl. No. 15/419,505 dated Feb. 13, 2018.
Non-Final Office Action for U.S. Appl. No. 16/005,364 dated Sep. 4, 2018.
Summons to Attend Oral Proceedings for European Application No. 13785921.1 dated Oct. 24, 2018.
Final Office Action for U.S. Appl. No. 16/005,364 dated Jan. 29, 2019.
Notice of Allowance and Interview Summary for U.S. Appl. No. 16/005,364 dated Jun. 4, 2019.
Intention to Grant for European Application No. 13785921.1 dated Jun. 28, 2019.
Non-Final Office Action for U.S. Appl. No. 16/600,957 dated Jun. 23, 2020.
Notice of Allowance for U.S. Appl. No. 16/600,957 dated Oct. 13, 2020.
Non-Final Office Action for U.S. Appl. No. 17/104,715 dated Feb. 7, 2022.
Final Office Action for U.S. Appl. No. 17/104,715 dated May 18, 2022.
Notice of Allowance for U.S. Appl. No. 17/104,715 dated Jul. 20, 2022.

* cited by examiner

PANEL

CROSS-REFERENCE TO RELATED APPLICATIONS

This application is a continuation of and claims priority to co-pending U.S. patent application Ser. No. 17/104,715, filed on Nov. 25, 2020, which is a continuation of and claims priority to the U.S. patent application Ser. No. 16/600,957, filed on Oct. 14, 2019, now U.S. Pat. No. 10,883,277 which is a continuation of and claims priority to the U.S. patent application Ser. No. 16/005,364, filed Jun. 11, 2018, now U.S. Pat. No. 10,443,248 which is a continuation of and claims priority to the U.S. patent application Ser. No. 15/419,505, filed Jan. 30, 2017, now U.S. Pat. No. 9,995,045 which is a continuation of and claims priority to U.S. patent application Ser. No. 14/633,923, filed Feb. 27, 2015, now U.S. Pat. No. 9,574,354 which is a continuation of and claims priority to PCT Patent Application No. PCT/IB2013/058022 filed Aug. 27, 2013, which claims priority to U.S. Provisional Patent Application No. 61/693,668, filed Aug. 27, 2012, the entire disclosures of which are incorporated by reference herein.

BACKGROUND

1. Technical Field

The present invention relates to a panel. In first instance, it relates to a floor panel, however, more generally, the invention can also be applied in other types of panels, for example, panels for a wall covering or ceiling.

More specifically, the invention relates to panels which on their edges can be coupled to each other and interlocked.

In particular, the invention relates to a panel of the type having an upper surface, a lower surface and at least one pair of opposite edges;

wherein said pair of edges comprises a first edge having a first joint profile and a second edge having a second joint profile;

wherein said joint profiles define coupling parts allowing that two of such panels can be joined, or are joinable, by a downward movement of the edge of one panel in respect to the edge of the other panel, wherein said coupling parts in a coupled condition provide a locking in a direction perpendicular to the plane of the coupled panels, as well as in a direction parallel to the plane of the coupled panels and perpendicular to the respective edges;

wherein the first joint profile comprises a first laterally projecting lip with a downward projecting locking part, said downward projecting locking part defining a male part;

wherein the second joint profile comprises a second laterally projecting lip with an upward projecting locking part, said upward projecting locking part defining proximally thereof a recess acting as a female part;

wherein the first laterally projecting lip with the downward projecting locking part defines a downward directed hook, whereas the second laterally projecting lip with the upward projecting locking part defines an upward directed hook;

wherein, in the coupled condition of two of such panels, the downward directed hook and upward directed hook engage behind each other so as to prevent drifting apart of the panels;

wherein said coupling parts further comprise vertically active locking portions which at least define a first point of contact and a second point of contact, said points of contact being located at opposite sides of said male and female parts;

wherein said vertically active locking portions comprise a first locking portion and a second locking portion at the respective opposite sides of said male part and a third locking portion and a fourth locking portion at the respective opposite sides of the female part;

wherein said first and third locking portions in the coupled condition of two of such panels define said first point of contact and have contact surfaces that in the coupled condition of two of such panels define an inclined tangent line;

wherein said second and fourth locking portions in the coupled condition of two of such panels define said second point of contact and have contact surfaces that in the coupled condition of two of such panels define an inclined tangent line;

wherein said male part has a distal side and a proximal side, said second locking portion being located at the distal side;

wherein the panel at said first edge has a distal edge defining the closing plane of the panels, said second locking portion being located in an inwardly offset position in regard to said distal edge; and wherein said joint profiles are in one piece from the panel material; and wherein measured according to a direction perpendicular to the plane defined by the panels, the second point of contact is closer to the plane defined by the upper surface of the panels than the first point of contact.

2. Related Art

Panels of this type are known from document DE 103 05 695 A1. An aim of the present invention is to improve the panels of this type and in particular to improve the coupling parts thereof. In particular, it is envisaged to obtain a coupling which, on the one hand, allows an easy joining by a downward movement of one panel in respect to the other, but, on the other hand, also offers a reliable coupling, which, amongst others, after a period of time will not obtain the tendency of getting released.

SUMMARY

To this end, the present invention relates to a panel of the above-mentioned type, said panel being characterized in that it further comprises or shows at least one feature or a combination of any two or any three features or a combination of all features, selected from the following four features:

measured according to a direction perpendicular to the plane of two of such coupled panels the distance between the first point of contact and the second point of contact is larger than 0.10 times the overall thickness of the panel;

the second point of contact is located higher than the upper edge of said upward projecting locking part;

the distance between the first and the second points of contact measured parallel to the plane of the panels and perpendicular to the respective edges is smaller than 4 times, and better smaller than 3 times the vertical distance between the first and second points of contact;

the co-operation at the second point of contact occurs by co-operating flat but inclined surfaces at the respective locking portions, whereas the co-operation at the second point of contact occurs by two co-operating surfaces of which at least one of them is and preferably both of them are curved.

In other words, according to the present invention, the above four features can be applied each separately or in any possible combination.

Each of the first three features, in combination with the fact that the second point of contact is located at a higher position than the first point of contact, offers the advantage that any tendency according to which the downward projecting locking part might leave the female part, in particular due to a slight rotation, is counteracted. The fourth feature allows a smooth joining by the curved surfaces, whereas by the flat but inclined surfaces simultaneously a reliable locking is guaranteed.

According to a preferred embodiment, the panel is characterized in that measured according to a direction perpendicular to the plane of two of such coupled panels the distance between the first point of contact and the second point of contact is larger than 0.15 times the overall thickness of the panel.

According to another preferred feature, the panel is characterized in that the lowermost contact at the second point of contact is located higher than the uppermost contact at the first point of contact.

According to still another preferred feature, the panel is characterized in that the lowermost contact at the second point of contact is located higher than the uppermost contact at the first point of contact over a distance of at least 0.10 and still better at least 0.15 times the overall thickness of the panel.

According to still another preferred feature, the panel is characterized in that the second point of contact is located higher than the level that generally is defined by the lower side of said first laterally projecting lip. As a result a better resistance is offered against tearing off of material parts, such as the tearing off of locking portions.

According to still another preferred feature, the panel is characterized in that it has a first pair of opposite edges and a second pair of opposite edges, said first and second joint profiles being provided at the second pair of opposite edges; in that the panel at the first pair of opposite edges comprises coupling parts that in the coupled condition of two of such panels provide a locking in a direction perpendicular to the plane of the coupled panels, as well as in a direction parallel to the plane of the coupled panels and perpendicular to the respective edges; and in that said coupling parts at the first pair of sides are configured such that they allow that two of such panels can be joined or are joinable by an angling movement of one panel in respect to the other, thereby allowing the joining of a plurality of such panels by the so-called fold-down technique.

According to still another preferred feature, the panel is characterized in that, seen in cross section, said first joint profile comprises only one vertically active locking portion at each side of said male part. This assists in a smooth joining.

According to still another preferred feature, the panel is characterized in that said first joint profile above the second locking portion comprises a laterally protruding lip, said lip comprising at its lower side a downward facing support surface, that in coupled condition is intended to co-operate with an upward directed support surface at the second joint profile of a coupled panel, thereby forming a third contact point. In a still further preferred embodiment hereof, the panel is also characterized in that in the coupled condition there are only four points of contact between the first joint profile and the second joint profile, namely the aforementioned first, second and third points of contact and a fourth point of contact at the distal end of said laterally protruding lip.

In the most preferred embodiment, the downward projecting locking part of the first joint profile is a solid part, at least in between the first and second points of contact. This offers the advantage that a stable material part is present between the points of contact, resulting in that no unwanted compression may occur.

Further, it is preferred that the aforementioned locking portions, which provide in a locking vertical to the plane of the panels, are configured such that one or more of the following features are obtained:

the cooperation at the second point of contact occurs by cooperating flat but inclined surfaces at the respective locking portions;

the cooperation at the first point of contact occurs by two cooperating surfaces of which at least one of them is and preferably both of them are curved;

the cooperation at the first point of contact occurs by frictionally engaged curved surfaces;

in respect to the plane of two coupled floor panels, the tangent line at the first point of contact is steeper than the tangent line at the second point of contact.

According to preferred embodiments, one or more intermediate spaces may be provided at certain locations, as will be clear from the detailed description.

According to an important preferred feature, the panel of the invention is characterized in that the first joint profile and the second joint profile are configured such that when two panels are joined together, these fit together with a so-called pretension wherein the coupled panels are urged towards each other.

Preferably, said first joint profile and said second joint profile are cut profiles, resulting in that an easy manufacturing is possible, for example, by milling cutters that are positioned under appropriate angles in respect to the plane of the panels and/or by scrapers and/or any other tools.

The panels may consist of any suitable material, wherein the aforementioned coupling parts can be realized.

An important application of the invention is in floor panels. Preferably, the floor panels hereby comprise at least a core layer and a surface or decor layer. The surface or decor layer may in its turn comprise one or more material layers.

Preferably, the panels according to the invention comprise a wood-based core or wood-based core layer. The aforementioned joint profiles, due to the claimed features, are of an utmost appropriate configuration for the integration in wood-based panels, as the claimed configuration provides an optimum compromise between good joining features and a stable and reliable joint structure.

The invention is especially beneficial in panels that comprise a core which at least at one of said edges of the first joint profile or second joint profile, and preferably in its entirety, consists of wood fiber board, in particular MDF (Medium Density Fiberboard) or HDF (High Density Fiberboard). As is well known, such fiberboard is a very economical material for the production of covering panels, such as decorative floor panels, however, shows the disadvantage that it is relatively brittle. However, due to a structure as claimed in the present invention, adequate coupling allowing joining by a downward movement of one panel in respect to another can nevertheless be integrated in this material.

For a broad range of applications, use will be made of laminated panels. In the case of floor panels, this will be a laminated floor panel, such as DPL (Direct Pressure Laminate) or HPL (High Pressure Laminate).

It is clear that the invention can also be applied in other types of floor panels than laminated floor panels. A first important application is in so-called "engineered wood" panels, also called prefabricated parquet. A second important application is in PVC-based panels, more particularly floor panels, and still more particularly so-called LVT tiles (Luxurious Vinyl Tiles) or similar plastic tiles.

It is clear that still other materials can be applied in panels of the invention, as a core layer and/or as other parts of the panel. Some further examples of such materials are veneers, such as plywood, oriented strand board, cores made from particles (including discrete pieces of polymer or wood, which can be in the form of chips, curls, flakes, sawdust, shavings, silvers, stands, wafers, wood flour, wood wool and/or fibers), polymer (thermosetting and/or thermoplastic), flaxboard, stone (e.g., ceramic, marble, slate), cardboard, concrete, gypsum, high density fiber reinforced plaster, and other structural materials, such as metals (e.g., brass, aluminum, steel, copper, composites, composites or alloys), foamed material (either open cell or closed cell), such as polyurethane, a composite material from multiple materials (such as those listed above), either as a heterogeneous mass, multiple layers or defined sections, e.g., upper and lower veneers covering a core of particles, antistatic or antibacterial property materials, e.g., by the inclusion of silver flakes, powders or particles, carbon black, ceramics, organic compounds or other metals or alloys, plastic material including extrudable and/or moldable thermosetting and/or thermoplastic resins, the latter including high density olefins and polyvinylchloride.

BRIEF DESCRIPTION OF THE DRAWINGS

With the intention of better showing the characteristics of the invention, hereafter, as an example without any limitative character, a preferred embodiment of the invention is described, with reference to the accompanying drawings, wherein.

DETAILED DESCRIPTION

Figure 1:
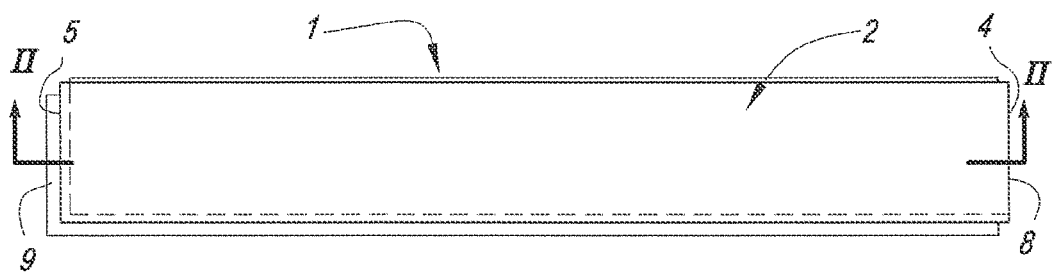
FIG. 1 represents in top plan view a panel, in this case a floor panel, according to the invention.
Figure 2:
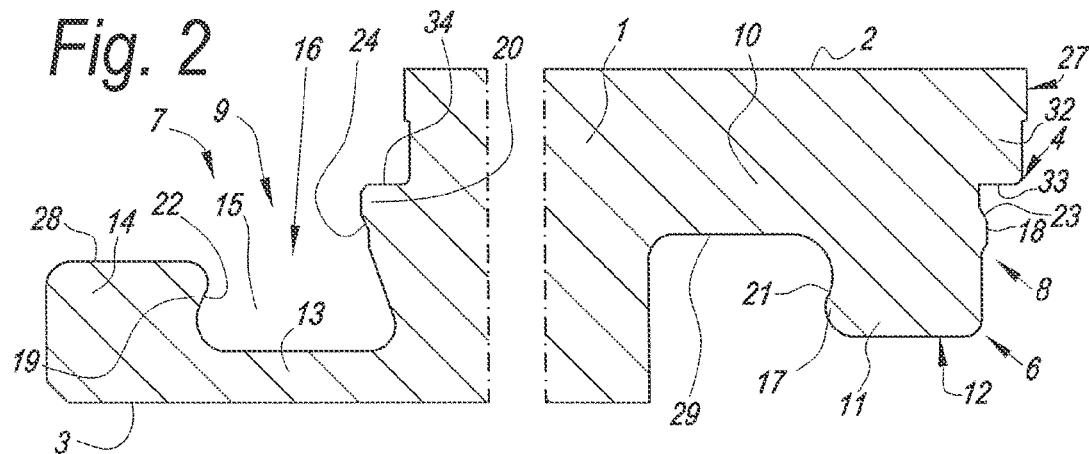
FIG. 2, at a larger scale, represents a cross-section according to line II-II in FIG. 1.

As represented in the drawings, the present invention relates to a panel 1 having an upper surface 2, a lower surface 3 and at least one pair of opposite edges 4-5;
wherein said pair of edges 4-5 comprises a first edge 4 having a first joint profile 6 and a second edge 5 having a second joint profile 7;
wherein said joint profiles 6-7 define coupling parts 8-9 allowing that two of such panels 1 can be joined or are joinable by a downward movement M of the edge of one panel 1 in respect to the edge of the other panel 1, wherein said coupling parts 8-9 in a coupled condition provide a locking in a direction R1 perpendicular to the plane of the coupled panels 1, as well as in a direction R2 parallel to the plane of the coupled panels 1 and perpendicular to the respective edges 4-5;
wherein the first joint profile 6 comprises a first laterally projecting lip 10 with a downward projecting locking part 11, said downward projecting locking part 11 defining a male part 12;
wherein the second joint profile 7 comprises a second laterally projecting lip 13 with an upward projecting locking part 14, said upward projecting locking part 14 defining proximally thereof a recess 15 acting as a female part 16;
wherein the first laterally projecting lip 10 with the downward projecting locking part 11 defines a downward directed hook, whereas the second laterally projecting lip 13 with the upward projecting locking part 14 defines an upward directed hook;
wherein, in the coupled condition of two of such panels 1, the downward directed hook and upward directed hook engage behind each other so as to prevent drifting apart of the panels 1;
wherein said coupling parts 8-9 further comprise vertically active locking portions which at least define a first point of contact C1 and a second point of contact C2, said points of contact C1 and C2 being located at opposite sides of said male and female parts 12 and 16;
wherein said vertically active locking portions comprise a first locking portion 17 and a second locking portion 18 at the respective opposite sides of said male part 12 and a third locking portion 19 and a fourth locking portion 20 at the respective opposite sides of the female part 16;
wherein said first and third locking portions 17 and 19 in the coupled condition of two of such panels 1 define said first point of contact C1 and have contact surfaces 21-22 that in the coupled condition of two of such panels 1 define an inclined tangent line T1;
wherein said second and fourth locking portions 18 and 20 in the coupled condition of two of such panels 1 define said second point of contact C2 and have contact surfaces 23-24 that in the coupled condition of two of such panels 1 define an inclined tangent line T2;
wherein said male part 12 has a distal side 25 and a proximal side 26, said second locking portion 18 being located at the distal side 25;
wherein the panel 1 at said first edge 4 has a distal edge 27 defining the closing plane of the panels, said second locking portion 18 being located in an inwardly offset position in regard to said distal edge 27, in other words, there is no portion of the panel protruding beyond the closing plane;
wherein said joint profiles 6-7 are in one piece from the panel material; and
wherein measured according to a direction perpendicular to the plane defined by the panels, the second point of contact C2 is closer to the plane defined by the upper surface 2 of the panels 1 than the first point of contact C1.

As explained in the introduction, the panel 1 is characterized in that it further comprises or shows one or more of the aforementioned four features. In the shown example, a combination of all four features is applied, namely:
measured according to a direction perpendicular to the plane of two of such coupled panels 1 the distance D1 between the first point of contact C1 and the second point of contact C2 is larger than 0.10 times the overall thickness T of the panel 1;

the second point of contact C2 is located higher than the upper edge 28 of said upward projecting locking part 14, by which is meant the uppermost point of the part 14;

the distance D2 between the first and the second points of contact C1-C2 measured parallel to the plane of the panels 1 and perpendicular to the respective edges 4-5 is smaller than 4 times, and better smaller than 3 times the vertical distance D1 between the first and second points of contact C1-C2;

the co-operation at the second point of contact C2 occurs by co-operating flat but inclined surfaces 23-24 at the respective locking portions, whereas the co-operation at the first point of contact C1 occurs by two co-operating surfaces 21-22 of which at least one of them is and preferably both of them are curved.

It should be noted that in the present specification, the term "point of contact", seen in a cross-section, can relate both to a local point contact as well as to a contact extending over a certain area. In cases where a distance D1 or D2 is to be defined by such "point of contact", in particular C1 and C2, such distance needs to be measured from the local point or, in case of a contact extending over a certain area, from the center of this area.

As represented, it is preferred that measured according to the direction perpendicular to the plane of two of such coupled panels 1 the distance D1 between the first point of contact C1 and the second point of contact C2 is even larger than 0.15 times the overall thickness T of such panel 1.

From the drawings, it is also clear that the shown embodiment has the following features, which in this embodiment are combined, but, of course, according to not shown variants, not necessarily need to be combined:

that the lowermost contact at the second point of contact C2 is located higher than the uppermost contact at the first point of contact C1; hereby, by the lowermost contact has to be understood the lowermost extremity of the contact area formed by the second point of contact C2, whereas by the uppermost contact has to be understood the uppermost extremity of the contact area formed by the first point of contact C1;

that the lowermost contact at the second point of contact C2 is located higher than the uppermost contact at the first point of contact C1 over a distance of at least 0.10 and still better at least 0.15 times the overall thickness T of the panel 1;

that the second point of contact C2 is located higher than the level that generally is defined by the lower side 29 of said first laterally projecting lip 10, wherein this relates to the lower side 29 that is located adjacent to the downward projecting locking part 11.

Figure 5:
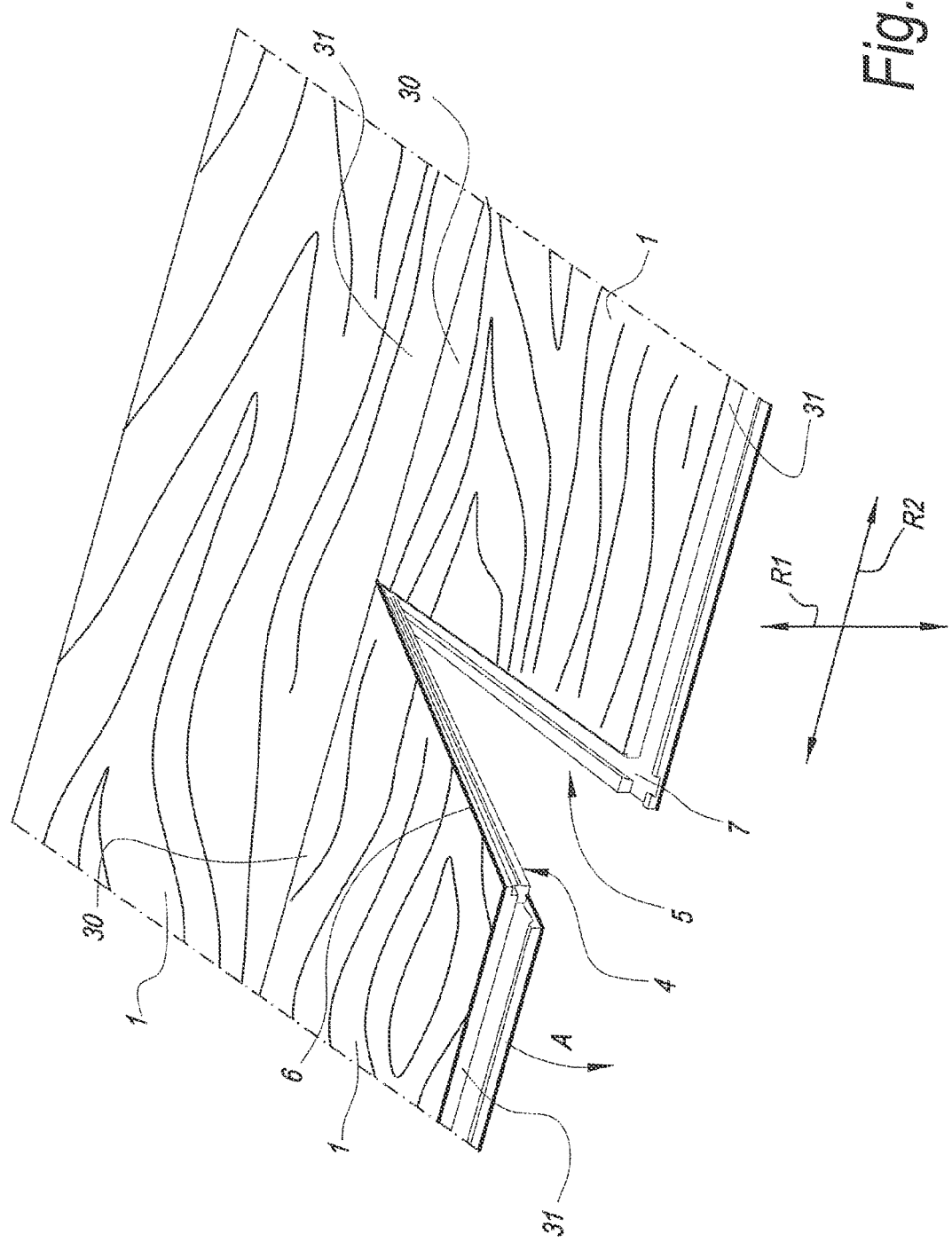
FIG. 5 schematically represents a plurality of the panels of FIGS. 1 to 4, during the coupling thereof.

Further, as indicated in FIGS. 1 and 5, such panel 1 is preferably characterized in that it has a first pair of opposite edges 30-31 and a second pair of opposite edges formed by the previously mentioned edges 4-5, said first and second joint profiles 6-7 thus being provided at the second pair of opposite edges 4-5; in that the panel 1 at the first pair of opposite edges 30-31 comprises coupling parts that in the coupled condition of two of such panels provide a locking in a direction perpendicular to the plane of the coupled panels, as well as in a direction parallel to the plane of the coupled panels and perpendicular to the respective edges; and in that said coupling parts at the first pair of edges are configured such that they allow that two of such panels can be joined, or are joinable, by an angling movement A of one panel in respect to the other, thereby allowing the joining of a plurality of such panels 1 by the so-called fold-down technique. Examples of coupling parts which allow joining by an angling movement A are as such well-known from the state of the art, especially from existing fold-down systems, and therefore are not shown or described in detail. For an example, reference is made to FIGS. 25 and 26 of WO 2009/066153.

The embodiment of the invention represented in the drawings also demonstrates the feature that, seen in cross-section, said first joint profile comprises only one vertically active locking portion at each side 25-26 of said male part 12.

As shown in the represented embodiment, the panel 1 preferably is also characterized in that said first joint profile 6 above the second locking portion 18 comprises a laterally protruding lip 32, said lip 32 comprising at its lower side a downward facing support surface 33, that in coupled condition is intended to co-operate with an upward directed support surface 34 at the second joint profile of a coupled panel 1, thereby forming a third point of contact C3. According to a further preferred feature, the panel 1 will hereby also be characterized in that in the coupled condition there are only four points of contact between the first joint profile and the second joint profile, namely the aforementioned first, second and third points of contact C1-C2-C3 and a fourth point of contact C4 at the distal end of said laterally protruding lip 32.

According to the invention, it is preferred that the downward projecting locking part of the first joint profile is a solid part, or at least is solid in between the first and second points of contact C1 and C2. In other words, in a straight line between both points of contact C1 and C2 no gaps, slots or the like are present.

Figure 4:
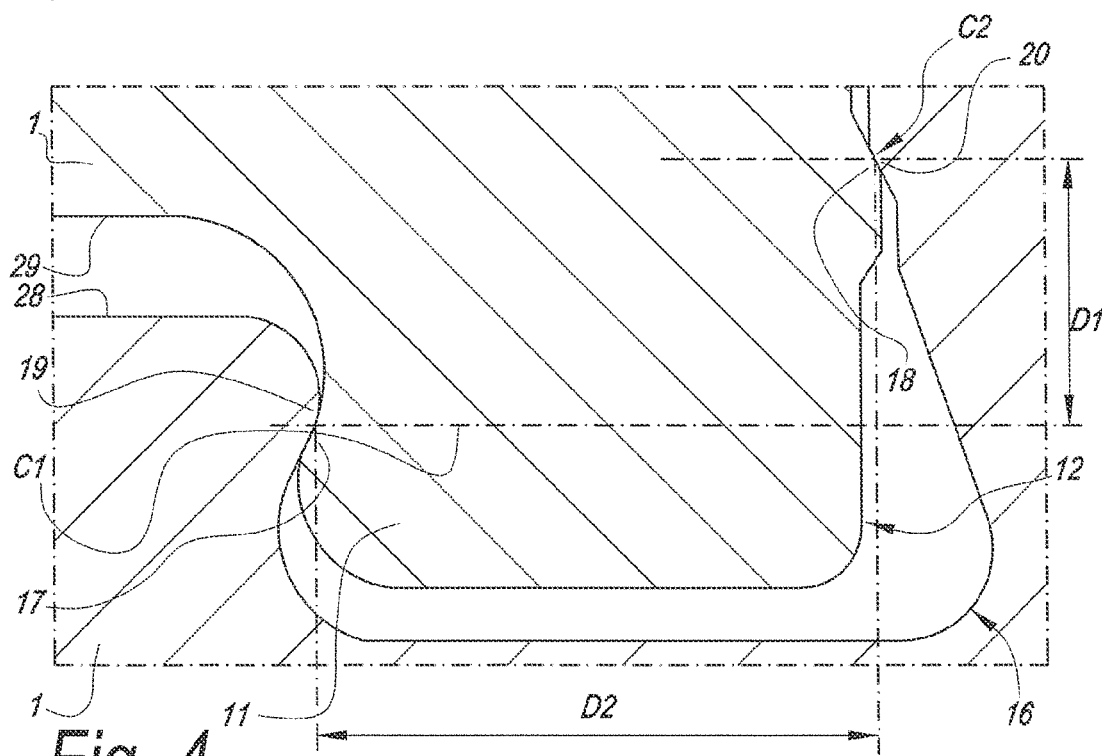
FIG. 4, at a larger scale, represents the portion indicated by F4 in FIG. 3.

It is clear that in the represented embodiment, also the following features are applied:
the cooperation at the second point of contact C2 occurs by cooperating flat but inclined surfaces 23-24 at the respective locking portions;
the cooperation at the first point of contact C1 occurs by two cooperating surfaces 21-22 of which at least one of them is and, as shown, preferably both of them are curved;
the cooperation at the first point of contact C1 occurs by frictionally engaged curved surfaces, as clearly visible in the enlargement of FIG. 4.

In a preferred embodiment and in respect to the plane of the two coupled floor panels 1, the tangent line T1 at the first point of contact C1 will be steeper than the tangent line T2 at the second point of contact C2.

Further, it is noted that the horizontal overlap, by which the first locking part 17 grips behind the third locking part 19, preferably is in the range of 0.05 to 0.3 mm, and still better in the order of magnitude of 0.1 mm. Other values are, however, not excluded.

Further, as also illustrated in the figures, one or more intermediate spaces may be provided. In the represented embodiment, intermediate spaces are applied at the following locations:
at least underneath the male part 12, such that there is no support between the distal lower end of the male part and the upper side of the second laterally projecting lip;
at least above the upward projecting locking part, such that there is no support between the distal upper end of the upward projecting locking part and the lower side of the first laterally projecting lip.

In the foregoing description, several times reference is made to vertical and horizontal directions, as well as to upper and lower sides and upward and downward directed parts, etc. It is clear that this should be seen in relation to panels which are in a flat position with the front side or decorative side facing upwards, as in floor panels. This, however, does not exclude that it may relate to panels that normally will be used in other positions, such as wall panels and ceiling panels, wherein said orientations then need to be interpreted as if the panel were put down with the decorative side facing upward.

Figure 3:
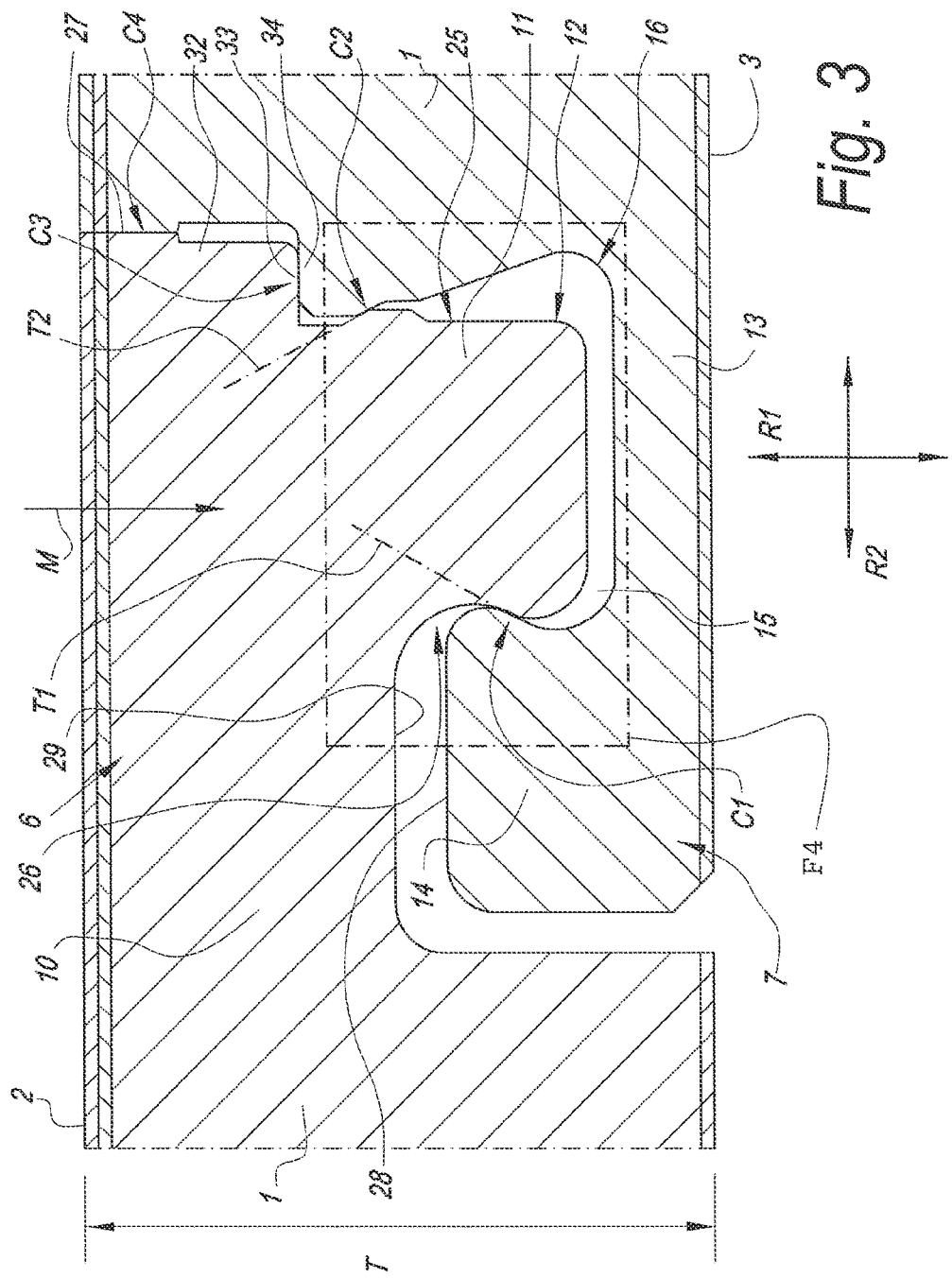
FIG. 3 in cross-section represents the edges of two of such panels in coupled condition.

It is noted that in FIG. 3 a top layer, comprising two layers, for example a decor layer and an overlay, and backing layer are represented. It is clear that this is only by way of example. Other compositions are possible.

It is clear that in the case of elongated panels, the aforementioned coupling parts 8-9, that provide in a so-called push-lock coupling, preferably will be applied at the short edges.

The present invention is in no way limited to the embodiment described by way of example and represented in the figures. On the contrary, such panels may be realized according to various alternatives, without leaving the scope of the invention. Amongst others, all different characteristics described with reference to the embodiment in the drawings can be applied separately or in any combined manner.

The invention claimed is:

1. A panel system comprising:
at least a first panel and a second panel;
wherein the first and second panels have an upper surface, a lower surface, and at least one pair of opposite edges;
wherein the at least one pair of opposite edges comprises a first edge having a first joint profile and a second edge having a second joint profile;
wherein the first and second joint profiles are in one piece from a panel material and define coupling parts allowing for joining the first and second panels by a downward movement of the first edge of the first panel with respect to the second edge of the second panel, wherein the coupling parts, in a coupled condition, provide a locking in a vertical direction perpendicular to a plane of the first and second panels, as well as in a horizontal direction parallel to the plane and perpendicular to the first and second edges;
wherein the first joint profile comprises a first laterally projecting lip with a downward projecting locking part, the downward projecting locking part defining a male part;
wherein the second joint profile comprises a second laterally projecting lip with an upward projecting locking part, the upward projecting locking part defining, proximally thereof, a recess acting as a female part;
wherein the first laterally projecting lip with the downward projecting locking part defines a downward directed hook, whereas the second laterally projecting lip with the upward projecting locking part defines an upward directed hook;
wherein, in the coupled condition of the first and second panels, the downward directed hook and the upward directed hook engage behind each other and define a first point of contact to prevent drifting apart of the first and second panels in the horizontal direction;
wherein the coupling parts further comprise vertically active locking portions, which at least define a second point of contact;
wherein the first and second points of contact are located at opposite sides of the male and female parts;
wherein the vertically active locking portions comprise a locking portion at the male part and a locking portion at the female part, the locking portions counteracting separation in the vertical direction of the first and second panels in the coupled condition, wherein the locking portions in the coupled condition define the second point of contact and have a contact surface defining an inclined tangent line, the contact surface of the locking portion at the male part facing upward in an inclined manner and the contact surface of the locking portion at the female part facing downward in an inclined manner;
wherein the first laterally protruding lip of one of the first and second panels comprises, at a lower side, a downward facing support surface that, in the coupled condition, is configured to co-operate with an upward directed support surface at the second joint profile of another of the first and second panels, thereby forming a third contact point;
wherein the first laterally protruding lip has a distal edge defining a closing plane of the first and second panels, the locking portion of the male part being located at a distal side of the male part at an inwardly offset position with regard to the distal edge;
wherein, measured according to a direction perpendicular to the plane, the second point of contact is closer to the plane than the first point of contact;
wherein the contact surfaces of the second point of contact are located completely above a level defined by an upper edge of the upward projecting locking part, with a lowermost contact at the second point of contact being located higher than an uppermost contact at the first point of contact; and
wherein, in the coupled condition, there are only four points of contact between the first joint profile and the second joint profile, the four points of contact comprising the first, second, and third points of contact and a fourth point of contact defined at the distal edge of the first laterally protruding lip.

2. The panel system of claim 1, wherein:
the first and second panels each have a first pair of opposite edges and a second pair of opposite edges, the first and second joint profiles being at the second pair of opposite edges;
the first and second panels at the first pair of opposite edges comprising coupling parts that, in the coupled condition of the first and second panels, provide a locking at respective edges in a direction perpendicular to the plane of the first and second panels, as well as in a direction parallel to the plane of the first and second panels and perpendicular to the respective edges;
the coupling parts at the first pair of opposite edges are configured such that respective first and second panels are joinable by an angling motion of one of the first and second panels with respect to another of the first and second panels; and
the first joining profile and the second joining profile of the second pair of opposite edges being configured such that joining of the first and second panels at the second pair of opposite edges can take place at a same time and concurrently with the angling motion at the first pair of opposite edges.

3. The panel system of claim 1, wherein cooperation of the first and second joining profiles at the first point of contact occurs at least by friction.

4. The panel system of claim 1, wherein, measured according to a direction perpendicular to the plane, a distance between the first point of contact and the second point of contact is larger than 0.15 times an overall thickness of the panel.

5. The panel system of claim 1, wherein cooperation of the first and second joining profiles at the second point of contact occurs by cooperating flat but inclined surfaces at respective locking portions.

6. The panel system of claim 1, wherein the downward projecting locking part of the first joint profile is a solid part, at least in between the first point of contact and the second point of contact.

7. The panel system of claim 1, wherein, in the coupled condition, a contact surface is formed at the first point of contact, the contact surface having a tangent line with respect to the plane of the first and second panels, the tangent line at the first point of contact being steeper than a tangent line at the second point of contact.

8. The panel system of claim 1, wherein intermediate spaces are at one or both of locations as follows:
at least underneath the male part, such that there is no support between a distal lower end of the male part and an upper side of the second laterally projecting lip; and
at least above the upward projecting locking part, such that there is no support between a distal upper end of the upward projecting locking part and a lower side of the first laterally projecting lip.

9. The panel system of claim 1, wherein the first joint profile and the second joint profile are cut profiles.

10. The panel system of claim 1, wherein the panel comprises a core, the core consisting of plywood, wood fiber board, MDF or HDF, at least at one of the edges of the first joint profile, one of the edges of the second joint profile, or an entirety thereof.

11. The panel system of claim 1, wherein the second laterally projecting lip has a distal end, the distal end being free from vertically active locking elements.

12. The panel system of claim 11, wherein the lowermost contact at the second point of contact is located higher than the uppermost contact at the first point of contact over a distance of at least 0.10 times an overall thickness of the panel.

13. The panel system of claim 1, wherein the first and second panels are a floor panel.

14. The panel system of claim 13, wherein the first and second panels comprise a wood based core.

15. The panel system of claim 13, wherein the first and second panels comprise a PVC-based panel or a LVT tile.

16. The panel system of claim 1, wherein the first joint profile and the second joint profile are configured such that, when the first and second panels are joined together, the first and second panels fit together with a pretension by which the first and second panels are urged towards each other.

17. A panel system comprising:
at least a first floor panel and a second floor panel;
wherein the first and second floor panels are each rectangular and comprise:
at least a first pair of opposite edges and a second pair of opposite edges, the first pair of opposite edges being a longer pair of edges than the second pair of opposite edges, which are shorter than the first pair of opposite edges; and
a core consisting of plywood, at least at the second pair of opposite edges;
wherein the first and second floor panels comprise, at the first pair of opposite edges, first coupling parts that, in a coupled condition of the first and second floor panels, provide a locking at respective edges in a horizontal direction perpendicular to a plane of the first and second floor panels, as well as in a vertical direction parallel to the plane and perpendicular to the first pair of opposite edges, and wherein the first coupling parts at the first pair of opposite edges are configured such that respective first and second floor panels are joinable by an angling motion of one of the first and second floor panels with respect to another of the first and second floor panels;
wherein the first and second floor panels comprise, at the second pair of opposite edges, a first edge having a first joint profile and a second edge having a second joint profile, wherein the first and second joint profiles are in one piece from a panel material and define second coupling parts allowing for joining the first and second floor panels by a downward movement of the first edge of the first floor panel with respect to the second edge of the second floor panel, wherein the second coupling parts, in a coupled condition, provide a locking in a vertical direction perpendicular to the plane, as well as in a horizontal direction parallel to the plane and perpendicular to the second pair of opposite edges;
wherein the first joint profile comprises a first laterally projecting lip with a downward projecting locking part, the downward projecting locking part defining a male part;
wherein the second joint profile comprises a second laterally projecting lip with an upward projecting locking part, the upward projecting locking part defining, proximally thereof, a recess acting as a female part;
wherein the first laterally projecting lip with the downward projecting locking part defines a downward directed hook, whereas the second laterally projecting lip with the upward projecting locking part defines an upward directed hook;
wherein, in the coupled condition of the first and second floor panels, the downward directed hook and the upward directed hook engage behind each other and define a first point of contact to prevent drifting apart of the first and second floor panels in the horizontal direction;
wherein the second coupling parts further comprise vertically active locking portions, which at least define a second point of contact;
wherein the first and second points of contact are located at opposite sides of the male and female parts;
wherein the vertically active locking portions comprise a locking portion at the male part and a locking portion at the female part, the locking portions counteracting separation in the vertical direction of the first and second floor panels in the coupled condition, wherein the locking portions in the coupled condition define the second point of contact and have a contact surface defining an inclined tangent line, the contact surface of the locking portion at the male part facing upward in an inclined manner and the contact surface of the locking portion at the female part facing downward in an inclined manner;
wherein the first laterally protruding lip of one of the first and second floor panels comprises, at a lower side, a downward facing support surface that, in the coupled condition, is configured to co-operate with an upward directed support surface at the second joint profile of another of the first and second coupled floor panels, thereby forming a third contact point;
wherein the first laterally protruding lip has a distal edge defining a closing plane of the first and second floor panels, the locking portion of the male part being located at a distal side of the male part at an inwardly offset position with regard to the distal edge;

wherein, measured according to a direction perpendicular to the plane, the second point of contact is closer to the plane than the first point of contact;

wherein the contact surfaces of the second point of contact are located completely above a level defined by an upper edge of the upward projecting locking part, with a lowermost contact at the second point of contact being located higher than an uppermost contact at the first point of contact;

wherein intermediate spaces are at one or both of locations as follows:

at least underneath the male part, such that there is no support between a distal lower end of the male part and the upper side of the second laterally projecting lip; and/or at least above the upward projecting locking part, such that there is no support between a distal upper end of the upward projecting locking part and the lower side of the first laterally projecting lip; and wherein, in the coupled condition, there are only four points of contact between the first joint profile and the second joint profile, the four points of contact comprising the first, second, and third points of contact and a fourth point of contact defined at the distal edge of the first laterally protruding lip.

18. The panel system of claim 17, wherein the second laterally projecting lip has a distal end, the distal end being free from vertically active locking elements.

19. The panel system of claim 17, wherein the lowermost contact at the second point of contact is located higher than the uppermost contact at the first point of contact over a distance of at least 0.10 times an overall thickness of the first and second floor panels.

\* \* \* \* \*